UNITED STATES PATENT OFFICE.

WILLIAM J. TEMPLE, OF BROOKLINE, MASSACHUSETTS.

PROCESS OF PREPARING LIQUID YEAST MIXTURES FOR BREAD.

No. 904,573.      Specification of Letters Patent.      Patented Nov. 24, 1908.

Application filed April 26, 1906. Serial No. 313,724.

*To all whom it may concern:*

Be it known that I, WILLIAM J. TEMPLE, of Brookline, county of Norfolk, State of Massachusetts, have invented an Improvement in Processes of Preparing Liquid Yeast Mixtures for Bread, of which the following description, in connection with the accompanying drawings, is a specification, like characters on the drawings representing like parts.

This invention relates to a process for preparing liquid yeast mixture for bread making, which contains compressed yeast and two of the bread-forming ingredients viz:— malt extract and a substance containing starch, which is adapted to be added to the other bread-forming ingredients or dough when in a high state of fermentation.

The essential objects of my invention are first, the utilization of the two bread-forming ingredients in the invigoration of the yeast, and second, the proportional decrease in the ratio of bacteria to yeast in the prepared mixture. When the original yeast is placed directly in the dough, the yeast and bacteria have a more equal chance to multiply and grow, and the unpleasant flavors produced by most bacteria are present in the bread. By my process, however, these bacteria do not develop sufficiently to impart an unpleasant flavor to the bread before the dough is raised, their growth being retarded, while the growth of the yeast has been accelerated.

My invention consists in dissolving compressed yeast in water, then adding to the solution two of the bread-forming ingredients, viz:—malt extract and a substance containing starch, in excess of the nutrient utilized in the development of the yeast, and maintaining the mixture thus prepared at a temperature unsuited to the growth of bacteria, for a short period of time, whereby the growth of the yeast is accelerated and the growth of the bacteria retarded. The proportion of yeast cells is thus largely increased with respect to the bacteria.

In carrying out my invention I first add three pounds of compressed yeast to three gallons of water. I then add to this solution a yeast food composed of two of the bread-forming ingredients, and maintain the solution at a temperature unsuited to the growth of bacteria for a short period of time. As a yeast food I employ malt-extract and what is commonly known as cream of maize, which is corn starch of a high quality. To the aforesaid solution I add say six pounds of malt-extract and seven pounds of cream of maize. The mixture containing the yeast food is then maintained at a temperature of 80 degrees F. for one hour, when it is ready to be used in the making of bread; but it must be used at once, otherwise it soon breaks down and loses its vigor and activity, and becomes worthless.

The starch itself is not a food for the yeast. In order to become available it must be hydrolyzed or inverted. This inversion is rapidly brought about by the diastase in the malt-extract. The function, therefore, of the malt-extract is two-fold; first, the sugars which it contains are themselves food for the yeast, and second, the diastase of the malt converts the starch into a mixture of sugars which are also food for the yeast. The diastase element of the malt-extract has doubtless other beneficial effects upon the bread, and the amount of corn-starch used reduces the amount of flour required by an equal amount employed or thereabouts, and being cheaper than flour is desirable.

The temperature of 80 degrees F. is the best for the rapid and vigorous growth of yeast while it is not so favorable to the growth of many species of bacteria, but my invention may be carried out at a temperature as high as 82 degrees F. the minimum being 80 degrees F. and the maximum being 82 degrees F., these temperatures being for the winter months in an artificially heated room. My process may be carried out to produce good and substantial results in less than one hour, say in half an hour, or even less than half an hour, but if continued longer than one hour the liquid yeast mixture begins to break down. Therefore a slight variation in temperature or a slight variation in time, as above noted, comes within the scope of my invention.

When the liquid yeast mixture thus treated has reached a high state of fermentation and is ready to be added to the other ingredients of the bread to proceed with the making thereof, the yeast food or nutrient is as yet unexhausted, although its physical character or condition has been modified, and when added to the other bread-forming ingredients enters into the composition of the bread in an entirely different manner than if said yeast food was added to the other ingredients of the bread when in its normal condition.

Several important results are produced:—

First:—The invigoration of the yeast. The yeast cells multiply under favorable conditions very rapidly and at the end of an hour's treatment or thereabouts each cell has probably multiplied itself twice, for in practice only one-half the original quantity of yeast is required. Furthermore the weak or deteriorated cells have also been re-invigorated and brought into a flourishing, rapidly growing condition.

Second:—The change in the physical character or condition of the bread-forming ingredients which are used as a yeast food, whereby said ingredients are worked into the bread in an entirely different manner than when introduced in their normal condition, with beneficial results not otherwise obtainable.

Third:—The proportional decrease in the bacteria. Although the treatment given the yeast is beneficial to most bacteria, yet under the conditions prescribed they do not grow so rapidly as does the yeast. When placed in the bread therefore, the invigorated yeast continues its rapid growth and keeps ahead of the bacteria.

It is well known that flour also contains bacteria. These commence to grow as soon as it is wet and warm. The less they develop the better. Hence the importance of a vigorous, healthy, rapidly growing yeast, as the flour bacteria do not have so much chance to grow.

I am aware that yeast foods have been employed in the cultivation and growing of yeast, but I am not aware that in the making of bread two of the bread-forming ingredients have ever been placed in solution with the yeast, to thereby serve as foods for the yeast and produce a liquid yeast mixture which, when in a high state of fermentation and before the nutrient is exhausted, is added to the other bread-forming ingredients, which results in largely reducing the original amount of yeast required, also in working into the bread certain bread-forming ingredients, the physical character or condition of which have been modified, and in the production of a better bread.

Having thus described my invention, what I claim as new and desire to secure by Letters Patent is:—

1. The herein described process of preparing a liquid yeast mixture for the making of bread, which consists in dissolving compressed yeast in water, then adding to the solution two of the bread-forming ingredients, viz:—starch and a substance containing sugar and also containing a converting agent for the starch, in excess of the nutrient utilized in the development of the yeast, and maintaining the mixture at a temperature of 80 F. for about one hour, when it is ready to be added to the other bread-forming ingredients in the making of the bread, as set forth.

2. The herein described process of preparing a liquid yeast mixture for the making of bread, which consists in dissolving compressed yeast in water, then adding to the solution two of the bread-forming ingredients, viz:—malt-extract and cornstarch, in excess of the nutrient utilized in the development of the yeast, and maintaining the mixture at a temperature of 80 F. for about an hour when it is ready to be added to the other bread-forming ingredients in the making of the bread, as set forth.

In testimony whereof, I have signed my name to this specification, in the presence of two subscribing witnesses.

WILLIAM J. TEMPLE.

Witnesses:
B. J. NOYES,
CYNTHIA DOYLE.